2,982,782
PROCESS FOR PRODUCING β-AMINONITRILES AND β-AMINOESTERS

William H. Selcer, Texas City, Tex., assignor to Monsanto Chemical Company, St. Louis, Mo., a corporation of Delaware No Drawing. Filed Aug. 23, 1957, Ser. No. 680,023

7 Claims. (Cl. 260—465.5)

The present invention relates to an improved method for the production of certain types of amino compounds. More particularly, it relates to the preparation of β-aminonitriles and β-aminoesters.

It is well known that valuable amino compounds can be obtained by the addition reaction effected between α,β-unsaturated nitriles and a nitrogen-reactive ammonia base such as ammonia, hydroxylamines, hydrazines, aliphatic, hydroaromatic or aromatic primary or secondary amines and polyamines of the same kind. Likewise, primary amines react readily with esters of α,β-unsaturated carboxylic acids such as methyl acrylate, for example, to yield β-aminopropionates. Generally, amines react with α,β-unsaturated acid derivatives of the acrylate type such as the lower aliphatic esters and nitriles of acrylic acid, methacrylic acid and crotonic acid without the aid of a catalyst. However, in this addition reaction steric effects are very important and the size and branching of the alkyl groups have a definite influence on the reaction. Yields, for example, reported for the reaction of acrylonitrile with tert-butylamine have been considerably lower than for the other butylamines. This decrease in yield is even more pronounced with tert-octylamine where the use of elevated temperatures, extended reaction time, or basic catalysts have all failed to give yields above 30%. The use of an acidic catalyst to overcome this difficulty has been described but certain losses of the amine reactant must be tolerated if it is to be used. Theoretically, the amine can be recovered by reaction of the acid derivative with a stronger base. Practically, however, this represents an additional step in the process as well as an additional reactant, acid losses occur in the recovery step, and the distillation system for recovery of the product is complicated by the presence of salts.

Recently, it has been discovered that these difficulties in the prior art can be obviated to a great extent by employing water as a catalyst in the addition reaction between amines which are characterized by steric hindrance and the α,β-unsaturated acid derivatives to give β-aminonitriles and β-aminoesters. The use of water as a catalyst provides excellent yields on a comparative basis. However, on an absolute basis with amines having a higher number of carbon atoms, such as nonylamine and higher, the yields still leave something to be desired. It has now been determined that yields from these higher amines can be materially increased by employing a water-soluble cyanoethylated amine as a solubilizer for the water catalyst in the reaction of these amines with α,β-unsaturated acid derivatives.

According to the invention, β-aminonitriles and β-aminoesters are produced by reacting tert-carbinamines of the formula $$RR'R''CNH_2$$

wherein R, R' and R'' are chosen from the group consisting of alkyl, cycloalkyl, aryl, alkaryl and aralkyl radicals containing from 1 to 12 carbon atoms with a compound chosen from the group consisting of the lower aliphatic esters and nitriles of α,β-unsaturated acids in the presence of a catalytic amount of water and a solubilizer therefor chosen from the group consisting of water-soluble cyanoethylated amines which are not subject to further reaction with the α,β-unsaturated acid derivatives under mildly alkaline conditions.

The following examples are presented to illustrate the invention but are not to be construed as limiting it in any manner.

EXAMPLE I

A series of experiments were made in which tert-nonylamine and tert-dodecylamine were reacted with acrylonitrile. The nonylamine and dodecylamine employed were mixtures of isomers of essentially tert-carbinamine structure obtained by the Ritter reaction of propylene trimer and hydrogen cyanide, and propylene tetramer and hydrogen cyanide, respectively. In one experiment, precautions were taken to use substantially anhydrous reagents. In the second, water was added as a catalyst and in the third a solubilizer was added with water catalyst. The reactions were carried out in a 300-ml., round-bottom, three-neck flask fitted with a 250-ml. dropping funnel, a thermometer, a stirrer, a reflux condenser and a heating mantle. The amine to be reacted, or the amine and water, or the amine, water and solubilizer were charged to the flask, stirred, and heated to the temperature of the lowest boiling reactant. The acrylonitrile was then added drop-wise from the funnel over a period of approximately 15 to 50 minutes. After addition of the nitrile was completed, the reaction mixture was refluxed for a period of one hour. Thereafter it was cooled, transferred to a flask fitted with a 6-in. x 1-in. distillation column packed with glass beads and having a head which was cooled by circulating ice water, and distilled. The water and acrylonitrile were removed at atmospheric pressure while the excess amine and product aminonitrile were separated by vacuum distillation (∼0–15 mm. of Hg absolute). Conversion of acrylonitrile to the respective products β-(tert-nonylamino)propionitrile, and β-(tert-dodecylamino)propionitrile was calculated in each case. Specific reaction conditions together with data obtained in the various runs are presented in Table I.

*Table I*

| Amine | Mole Amine/ Mole AN[1] Fed | Percent $H_2O$ Added | Solubilizer | Amt. of Solubilizer (g.) | Reaction Temp., °C. | Aminonitrile Product (g.) | Conversion, Percent |
|---|---|---|---|---|---|---|---|
| t-nonyl | 0.5/0.5 | None | None | 0 | 84–89 | 0 | 0 |
| Do | 0.5/0.5 | 10 | None | 0 | 84–89 | 26.3 | 26.8 |
| Do | 0.25/0.25 | 10 | β-(t-butylamino) propionitrile | 4.5 | 78–84 | 17.1 | 34.9 |
| t-dodecyl | 0.25/0.25 | None | None | 0 | 78–85 | 0 | 0 |
| Do | 0.25/0.25 | 10 | None | 0 | 78–84 | 12.8 | 21.5 |
| Do | 0.25/0.25 | 10 | β,β'-iminodipropionitrile | 15.0 | 79–87 | 33.8 | 56.8 |

[1] Acrylonitrile.

EXAMPLE II

The same apparatus employed in Example I was used in this experiment. About 46.2 g. (0.25 mole) of tert-dodecylamine, 36.0 g. of β-(ethylamino)propionitrile, 4.6 g. of H₂O and 0.25 g. of copper powder were charged to the reaction flask and heated to about 79° C. (The copper powder was added to inhibit polymerization of the ethyl acrylate.) While this mixture was stirred continuously, 25.0 g. (0.25 mole) of ethyl acrylate was added dropwise to it over a period of about 20 min. The reaction mixture was then brought to reflux temperature (100–101° C.) and was maintained under reflux conditions for about 1 hr. After cooling to room temperature, the mixture was subjected to distillation for removal of unreacted tert-dodecylamine, ethyl acrylate and the β-(ethylamino)propionitrile solubilizer and recovery of the product, ethyl-β-(tert-dodecylamino)propionate. The yield of product was 44.3 g. representing a conversion of 62.3% based on the tert-dodecylamine charged.

When this experiment was repeated with all conditions and procedures identical except that the β-(ethylamino)-propionitrile was not employed as solubilizer, the conversion of tert-dodecylamine to ethyl-β-(tert-dodecylamino)propionate was only 38.8%.

EXAMPLE III

The suitability of various water-soluble cyanoethylated amines as solubilizers for the water catalyst in the reaction of t-carbinamines with α,β-unsaturated acid derivatives was determined by a series of simple tests. Into each of a number of test tubes there was placed 35 drops of the t-nonylamine used in Example I, 13 drops of acrylonitrile, and 3 drops of water. The amount of amine and nitrile represented a 1:1 ratio on a mole weight basis and the amount of water was equivalent to 10% by weight of the amine reactant. The test tubes were placed in an oil bath and heated until the contents were at a temperature of approximately 75° C. To these tubes there was then slowly added dropwise β-(n-butylamino)-propionitrile, β-(cyclohexylamino)propionitrile, β-(ethylamino)propionitrile, β,β'-iminodipropionitrile, β-(n-butylamino)dipropionitrile and β-(t-octylamino)propionitrile, respectively, until all the water present went into solution in the amine. Solution was effected with each one of these solubilizers in the amounts indicated below. The solubilizers are arranged in the order of preference for their use.

|  | Drops required |
|---|---|
| β,β'-Iminodipropionitrile | 7 |
| β-(Ethylamino)propionitrile | 8 |
| β-(Cyclohexylamino)propionitrile | 15 |
| β-(n-Butylamino)dipropionitrile | 16 |
| β-(n-Butylamino)propionitrile | 26 |

These same tests were repeated using 46 drops of the t-dodecylamine, 13 drops of acrylonitrile and 4 drops of water. Amounts of the cyanoethylated amines in drops required to solubilize the water in this case were as follows:

|  | Drops required |
|---|---|
| β-(t-Butylamino)propionitrile | 15 |
| β-(Ethylamino)propionitrile | 20 |
| β-(n-Butylamino)propionitrile | 24 |
| β-(Cyclohexylamino)propionitrile | 45 |
| β-(n-Butylamino)dipropionitrile | 60 |

The tests were again repeated using 46 drops of tert-dodecylamine, 25 drops of ethyl acrylate and 5 drops of water. Here, the amount of the different cyanoethylated amines required to solubilize the water were as follows:

|  | Drops required |
|---|---|
| β-(Ethylamino)propionitrile | 36 |
| β-(tert-Butylamino)propionitrile | 80 |
| β-(Cyclohexylamino)propionitrile | 92 |
| β-(n-Butylamino)propionitrile | 99 |

The data from the examples show clearly that the addition of water-soluble cyanoethylated amines effects solubilization of water in the higher t-carbinamines which are characterized by steric hindrance in a system containing these amines, acrylonitrile or ethyl acrylate, and water. By so doing they facilitate the functioning of the water as a catalyst and result in significant increases in yields in the addition reaction of these so-called "hindered" amines and α,β-unsaturated acid derivatives. It is understood, of course, that such cyanoethylated amine solubilizers to be effective must not be subject to further reaction with the α,β-unsaturated acid derivatives under the conditions of the addition reaction, i.e., under mildly alkaline conditions.

Some variations may be made in reaction conditions from those given in the example without departing from the scope of the invention. Other suitable amines in addition to those mentioned in the examples which may be reacted according to the process of the invention include, for example, 3-methyl-3-aminohexane, 3-ethyl-3-aminopentane, tert-pentadecylamine, 2-cyclohexyl-2-aminobutane, 2-cyclopentyl-2-aminopropane, 2-phenyl-2-aminopropane, 2-benzyl-2-aminohexane, 2-tolyl-2-aminobutane, 1,1-di-(p-methylphenyl)-1-aminoethane, 1-cyclohexyl-1-benzyl-1-aminopropane, and the like. Likewise, in addition to those given in the examples, suitable nitriles and lower aliphatic esters of α,β-unsaturated acids include methacrylonitrile, crotononitrile, methyl acrylate, ethyl acrylate, propyl acrylate, ethyl methacrylate, propyl crotonate, methyl crotonate, and the like. "Lower aliphatic esters" is taken to mean those esters in which the alcohol portion of the ester is an alkyl group containing from 1 to 4 carbon atoms.

While it is preferred to employ stoichiometric quantities of the reactants, quantities in slight excess of the theoretical may be employed. No advantage is seen in using large excesses of either reactant while some difficulties might be created in certain instances.

The amount of water employed as catalyst may vary over a wide range from as little as 0.1% to as much as 15% by weight of the amine. Preferably, from about 3% to about 10% water provides most effective catalysis of the reaction.

The amount of cyanoethylated amine solubilizer to be employed may vary widely depending upon the amine being reacted and the amount of water employed as a catalyst in a specific instance. The optimum quantity is represented by the minimum amount which will effect a completely homogeneous solution of the reactants and the catalyst. This is readily determinable by observation or by simple testing. Usually, from about 10% to about 200% of the solubilizer by weight of the amine reactant is employed.

Generally, the reaction proceeds at temperatures from about room temperature to about 150° C. In some cases, it can be conducted at temperatures as low as 0° C. and as high as 200° C. but in any case reaction temperature is maintained below the decomposition temperatures of the reaction components. At room temperature or below, an extended period of time may be required for reaction, so it is preferred to conduct the reaction at temperatures between about 40 and 100° C.

The aminonitriles produced by the invention are useful as chemical intermediates. They may be readily reduced to polyamines and the amino group therein is available for reaction with acids, alkylene oxides, alkyl acid chlorides, and the like for the preparation of many useful products such as textile assistants, solvents, etc. The aminoesters lead to detergents, emulsifying agents, surfactants, flotation agents, and the like.

What is claimed is:

1. The process which comprises reacting a tert-carbinamine of the formula

RR'R"CNH₂ wherein R, R' and R" are chosen from the group consisting of alkyl, cycloalkyl, aryl, alkaryl, and aralkyl radicals containing from 1 to 12 carbon atoms with a compound selected from the group consisting of the nitriles and lower alkyl esters of acrylic acid, methacrylic acid, and crotonic acid to yield the corresponding β-aminonitriles and β-aminoesters at a temperature from about 0° C. to about 200° C. in the presence of a catalytic quantity of water, said amount of water being in the range from about 0.1% to about 15% by weight of the tert-carbinamine, and as a solubilizer therefor a water-soluble cyanoethylated amine chosen from the group consisting of secondary N-(β-cyanoethyl) alkyl amines wherein the alkyl substituent is a lower alkyl group, secondary N-(β-cyanoethyl) cycloalkylamines and secondary N,N-bis(β-cyanoethyl) amine, said solubilizer being present in an amount in the range from about 10% to about 200% by weight of the carbinamine.

2. The process which comprises reacting a tert-carbinamine of the formula

RR'R"CNH$_2$ wherein R, R' and R" are alkyl radicals containing from 1 to 12 carbon atoms with a compound selected from the group consisting of the nitriles and lower alkyl esters of acrylic acid, methacrylic acid, and crotonic acid to yield the corresponding β-aminonitriles and β-aminoesters at a temperature from about 0° C. to about 200° C. in the presence of a catalytic quantity of water, said amount of water being in the range from about 0.1% to about 15% by weight of the tert-carbinamine, and as a solubilizer therefor a water-soluble cyanoethylated amine chosen from the group consisting of secondary N-(β-cyanoethyl) alkylamines wherein the alkyl substituent is a lower alkyl group, secondary N-(β-cyanoethyl) cycloalkylamines and secondary N,N-bis(β-cyanoethyl) amine, said solubilizer being present in an amount in the range from about 10% to about 200% by weight of the carbinamine.

3. A process for the production of aminonitriles which comprises reacting a tert-carbinamine of the formula

RR'R"CNH$_2$ wherein R, R' and R" are alkyl radicals containing from 1 to 12 carbon atoms with acrylonitrile at a temperature in the range from about 0° C. to about 150° C. and in the presence of an amount of water in the range from about 0.1% to about 15% by weight of the tert-carbinamine, and as a solubilizer therefor a water-soluble cyanoethylated amine chosen from the group consisting of secondary N-(β-cyanoethyl) alkylamines wherein the alkyl substituent is a lower alkyl group, secondary N-(β-cyanoethyl) cycloalkylamines and secondary N,N-bis(β-cyanoethyl) amine, said solubilizer being present in an amount in the range from about 10% to about 200% by weight of the carbinamine.

4. A process for the production of β-(tert-nonylamino)-propionitrile which comprises reacting tert-nonylamine with acrylonitrile at a temperature in the range from about 40° C. to about 100° C., in the presence of an amount of water in the range from about 3% to about 10% by weight of the tert-nonylamine, and as a solubilizer therefor β-(tert-butylamino)propionitrile in an amount in the range from about 10% to about 200% by weight of said nonylamine.

5. A process for the production of β-(tert-dodecylamino)propionitrile which comprises reacting tert-dodecylamine with acrylonitrile at a temperature in the range from about 40 to about 100° C. in the presence of an amount of water in the range from about 3% to about 10% by weight of the tert-dodecylamine and as a solubilizer therefor β,β'iminodipropionitrile in an amount in the range from about 10% to about 200% by weight of said tert-dodecylamine.

6. A process for the production of amino esters which comprises reacting a tert-carbinamine of the formula

RR'R"CNH$_2$ wherein R, R', and R" are alkyl radicals containing from 1 to 12 carbon atoms with a compound chosen from the group consisting of the lower alkyl esters of acrylic acid, methacrylic acid, and crotonic acid at a temperature from about 0° C. to about 200° C. in the presence of an amount of water in the range from about 0.1% to about 15% by weight of the tert-carbinamine and as a solubilizer therefor a water-soluble cyanoethylated amine chosen from the group consisting of secondary N-(β-cyanoethyl) alkylamines wherein the alkyl substituent is a lower alkyl group, secondary N-(β-cyanoethyl) cycloalkylamines and secondary N,N-bis(β-cyanoethyl) amine, said solubilizer being present in an amount in the range from about 10% to about 200% by weight of the carbinamine.

7. A process for the production of ethyl-β-(tert-dodecylamino) propionate which comprises reacting ethyl acrylate with tert-dodecylamine at a temperature in the range from about 40° C. to about 100° C. in the presence of an amount of water in the range from about 3 to about 10% by weight of the tert-dodecylamine and as a solubilizer therefor β-(ethylamino)propionitrile in an amount in the range from about 10% to about 200% by weight of said dodecylamine.

References Cited in the file of this patent
UNITED STATES PATENTS

| | | |
|---|---|---|
| 1,992,615 | Hoffmann et al. | Feb. 26, 1935 |
| 2,451,852 | McLamore | Oct. 19, 1948 |